Patented May 5, 1942

2,281,879

UNITED STATES PATENT OFFICE 2,281,879

PREPARATION OF ORGANIC BASE COMPOUNDS

David W. Jayne, Jr., Old Greenwich, Conn., assignor to American Cyanamid Company, New York, N. Y., a corporation of Maine No Drawing. Application June 21, 1941, Serial No. 399,237

6 Claims. (Cl. 260—564)

The present invention relates to a method of preparing an organic nitrogen base which is soluble in a water soluble alcohol, which includes reacting an inorganic salt of the base with an alkali-forming metal hydroxide in a medium of a substantially anhydrous water-soluble alcohol and removing the insoluble alkali metal salt thus formed.

The invention is particularly concerned with the preparation of such materials by a convenient method so as to obtain the products in a reasonable state of purity with optimum yields while at the same time avoiding the difficulties attendant recovery thereof from a water solution.

It is to be distinctly understood that the invention contemplates the preparation of any organic nitrogen base which, first, is soluble in any water-soluble alcohol and, second, which may be freed from an inorganic salt thereof by means of an alkali-forming metal hydroxide. Among such bases may be mentioned guanidine, biguanide, guanyl urea, pyridine, piperidine, analine, various amines such as lauryl amine, naphthyl amine, ethanol amine, phenylene-diamine, diethylene triamine and the like. Inasmuch as it is the inorganic acid radical of the base salt which reacts with the alkali-forming metal of the hydroxide, the invention also contemplates the preparation of any of the substituted organic nitrogen bases as well as the unsubstituted compounds. Such substituents may be alkyl, aryl, aralkyl, cyclohexyl, halogen, nitro or the like.

In carrying out the reaction, it is only necessary to slurry together an inorganic acid salt of the base to be prepared with an alkali-forming metal hydroxide, that is, those of the alkali or alkaline earth metals in a medium consisting predominantly of a water-soluble alcohol, whether straight or forked chain, and whether primary, secondary or tertiary, as well as mono and polyhydric compounds, the only essential being that the free base shall be soluble therein and that such alcohol shall of itself be water-soluble. It is preferable that the alcohol used shall be in a substantially anhydrous state in order that the chemical water formed in the reaction shall not unduly dilute the reacting medium and thus either slow down the reaction or introduce water complication.

The invention is particularly applicable and useful in the preparation of the guanidines, whether substituted or unsubstituted, as shown by the following examples:

Example I 240 pounds of anhydrous isopropyl alcohol are charged into a kettle equipped with an agitator. 60 pounds of guanidine nitrate are added with agitation and then 32 pounds of solid KOH over a period of fifteen to twenty minutes. The mixture was allowed to react with agitation until complete, which took from two to three hours. The test for reaction completion consisted in taking a sample of the slurry, the insoluble potassium nitrate allowed to settle, the clear liquid decanted and divided into two portions. An alcoholic solution of potassium hydroxide was added to one portion and an alcoholic solution of guanidine nitrate was added to the other. If either of these reagents caused more than slight cloudiness, it indicated a deficiency of that material. In such cases, small amounts of the necessary material were added until the adjustment was complete. The resulting slurry was filtered and the potassium nitrate cake washed with 100 pounds of alcohol and blown dry with air. The filtrate and wash alcohol were combined and dehydrated by adding five pounds of flake caustic soda for each fifty gallons of liquid, with agitation. The liquid is then permitted to stratify and the lower caustic water layer drawn off. Guanidine may be recovered from the upper layer by simple evaporation of the alcohol or may be used as such as a reacting medium for the preparation of further guanidine compounds.

Example II

A slurry of 300 grams of —30 mesh 96% guanidine nitrate in 500 grams of 95% ethyl alcohol was stirred continuously and heated under reflux with agitation. A solution of 140 grams of 85% potassium hydroxide in 500 grams of 95% ethyl alcohol at 50° C. was added in a steady stream to the guanidine nitrate slurry over a period of one-half hour. The mix became a very thick homogeneous slurry. It was stirred and refluxed one-half hour more and then cooled to 20° C. with continuous agitation over a period of one hour.

The cooled reaction mix was then filtered on a suction filter and the cake consisting of potassium nitrate sucked dry, washed with two 100 cc. portions of anhydrous ethyl alcohol and dried at 100° C. The potassium nitrate recovered was in an extremely fine state of subdivision and represented a yield equal to 98% of theory.

Example III 50 grams of guanidine hydrochloride were slurried in 50 cc. of anhydrous 2B alcohol and a solution of 32 grams of 88% KOH in 120 cc. of 2B alcohol added slowly with agitation. The mix was warmed to 50° C. and, when reaction was complete, cooled to room temperature. The resulting pasty mass was filtered to remove the potassium chloride formed and the filter cake washed with alcohol. The filtrate was dehydrated with solid KOH, permitted to stratify and the guanidine recovered from the upper substantially anhydrous layer.

In a similar manner, the substituted guanidines may be prepared. Any substituted guanidine may be thus formed and recovered, provided only that such guanidine is soluble in the alcohol used and may be freed from its inorganic salt by the use of an alkali forming metal hydroxide.

This application is a continuation in part of my copending application Serial No. 278,012, filed June 8, 1939.

While the invention has been described with particular reference to specific embodiments, it is to be understood that it is not to be limited thereto but is to be construed broadly and restricted solely by the scope of the appended claims.

I claim:

1. A method of preparing an organic nitrogen base which is soluble in a water soluble alcohol, which includes reacting an inorganic salt of said base with an alkali-forming metal hydroxide in a medium of a substantially anhydrous water soluble alcohol, and removing the insoluble alkali metal salt thus formed.

2. A method of preparing a guanidine which is soluble in a water soluble alcohol, which includes reacting an inorganic salt of said guanidine with an alkali-forming metal hydroxide in a medium of a substantially anhydrous water soluble alcohol and removing the insoluble alkali metal salt thus formed.

3. A method of preparing a substituted guanidine which is soluble in a water soluble alcohol, which includes reacting an inorganic salt of said substituted guanidine with an alkali-forming metal hydroxide in a medium of a substantially anhydrous water soluble alcohol and removing the insoluble alkali metal salt thus formed.

4. A method of preparing guanidine which comprises reacting an inorganic salt of guanidine with an alkali-forming metal hydroxide using a water soluble alcohol chosen from the group consisting of primary and secondary alcohols as a reaction medium, and recovering the guanidine from the reaction magma.

5. A method of preparing guanidine which comprises reacting guanidine nitrate with caustic potash in a medium of 95% ethyl alcohol, filtering off the insoluble potassium nitrate and recovering guanidine from the filtrate.

6. A method of preparing guanidine which comprises reacting an inorganic salt of guanidine with an alkali-forming metal hydroxide using isopropyl alcohol as a reacting medium and recovering guanidine from the reaction magma.

DAVID W. JAYNE, Jr.